United States Patent [19]

Lipari

[11] 3,783,682
[45] Jan. 8, 1974

[54] TORQUE TESTING SCREWDRIVER WITH AUTOMATIC TORQUE INDICATING MEANS
[75] Inventor: Dominic Timothy Lipari, Columbus, Ohio
[73] Assignee: Bell Telephone Laboratories, Incorporated, Murray Hill, N.Y.
[22] Filed: Dec. 16, 1971
[21] Appl. No.: 208,683

[52] U.S. Cl. .................................. 73/139, 81/52.5
[51] Int. Cl. ............................................. G01l 5/24
[58] Field of Search ...................... 73/1 C, 88 F, 99, 73/139, 133, 136 A; 81/52.5

[56] References Cited
UNITED STATES PATENTS
2,225,420  12/1940  Mandl.................................. 73/139
2,607,219  8/1952  Millard et al. ....................... 73/139

Primary Examiner—Charles A. Ruehl
Attorney—W. L. Keefauver et al.

[57] ABSTRACT

A torque-testing screwdriver is disclosed which includes a blade, a handle, a spring for transmitting torque from the handle to the blade, a scale for indicating the amount of torque transmitted from the handle to the blade, and an indicating contact which continuously enables a signal device during the torque test and which automatically positions itself opposite the scale reading representing the maximum resistive torque exerted by the screw under test.

10 Claims, 3 Drawing Figures

PATENTED JAN 8 1974

3,783,682

TORQUE TESTING SCREWDRIVER WITH AUTOMATIC TORQUE INDICATING MEANS

BACKGROUND OF THE INVENTION

1. Field of the Invention

This invention relates to devices for testing the tightness of fastening devices and pertains, in particular, to torque-testing screwdrivers.

2. Description of the Prior Art

Heretofore, the amount of torque exerted on a screw under test by a torque-testing screwdriver has been monitored by an indicator which follows the torque as it increases. Typically, the operator watches the indicator and takes a measurement at the precise instant the screw first begins to turn. In order to obtain accurate readings, however, the operator must continually monitor the progress of the indicator. If he fails to do so, he can easily miss the momentary "fall-off" which the indicator exhibits just as the screw starts to turn. Any indicator reading taken after "fall-off" would be different than the maximum amount of resistive torque exerted by the screw before it turned.

Accordingly, an object of this invention is to achieve simple, convenient and accurate torque measurements.

SUMMARY OF THE INVENTION

In accordance with the preferred embodiment of this invention, a torque-testing screwdriver having a handle, a blade and a spring for transferring torque from the handle to the blade includes a torque indicating scale, a signal device and two contacts which interact to enable the signaling device during the test period.

According to one feature of this invention, the two contacts enable the signal device during the period torque is applied to the screw under test and then disable the signal device when the point of maximum resistive torque is reached, thereby providing the operator with an affirmative indication that the test is complete and allowing him more freedom in the degree of attention he must exert during the test.

According to another feature of this invention, when the signal device is disabled, one of the two contacts simultaneously comes to rest at a position opposite a graduation on the torque-testing scale which represents the maximum amount of resistive torque exerted by the screw under test whereby a precise indication of exerted torque is achieved.

DESCRIPTION OF THE DRAWINGS

A better understanding of the foregoing and other objects and features of this invention will be facilitated by reference to the drawing in which.

DETAILED DESCRIPTION

Figure 2:
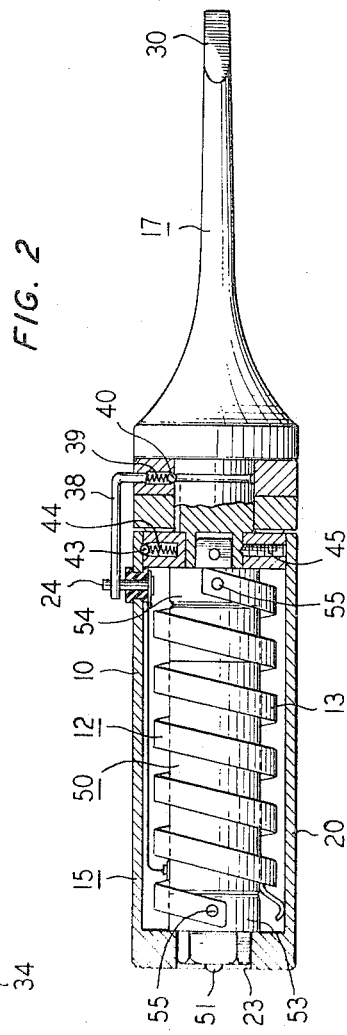
FIG. 2 is an elevation view taken in section of the torque-testing screwdriver shown in FIG. 1.

Referring to FIG. 2, a torque-testing screwdriver 10 is disclosed which includes a spring assembly 12, a handle 15 and a blade 17. The spring assembly 12 includes a spring 13 which is made of a stiff material such as steel and which is designed to transmit torque between the handle 15 and the blade 17.

The handle 15 includes a hollow, cylindrical housing 20 which is advantageously made of electrically conducting material such as aluminum. It includes a groove 21 for engaging the blade 17, a mounting hole 23 and a contact 24. The contact 24 is electrically conducting and is rigidly connected to, and insulated from, the housing 20 in a conventional manner. For reasons to be explained below, the mounting hole 23 is advantageously hexagonal in shape.

Figure 1:
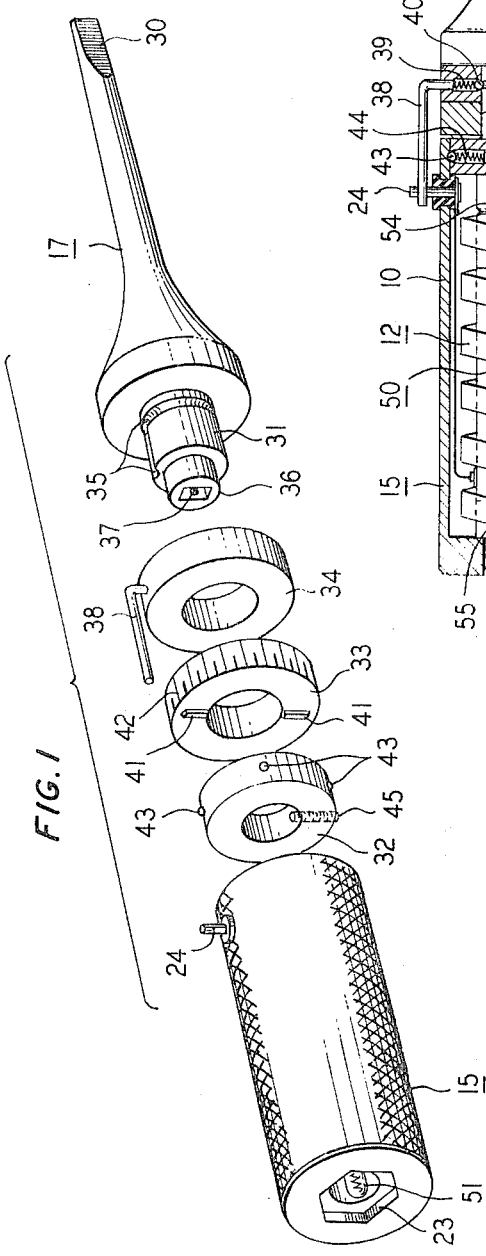
FIG. 1 is an exploded view taken in elevation of a torque-testing screwdriver made in accordance with this invention.

As best seen in FIG. 1, the blade 17 includes a typical screwdriver end 30 for engaging a screw to be torque tested, a projecting boss 31 and three ring members 32, 33 and 34. The end 30 and the boss 31 are part of an integral assembly which is electrically conducting.

The boss 31 has two grooves 35 and includes a shoulder 36 which is apertured with a rectangular opening. Within the opening are detent pockets 37 for helping hold the blade 17. As shown in FIG. 2, the ring members 33 and 34 fit on the boss 31, while the ring member 32 fits on the shoulder 36. The ring member 34 includes an indicator contact 38, a spring 39 and a ball 40, and all are made of an electrically conducting material. The indicator contact 38 is L-shaped and, together with the spring 39 and ball 40, fits in a hole in the ring member 34. The portion of the indicator contact 38 in the hole compresses the spring 39 which, in turn, forces the ball 40 into the circumferential groove 35 in the boss 31 thereby making a continuous electrical circuit from the boss 31 to the indicator contact 38. The other groove 35 runs axially on the boss 31 and permits easy insertion of the ring member 34 onto the boss 31.

Both ring members 32 and 33 are made of a nonelectrically conducting material such as nylon. The ring member 33 includes friction ribs 41 and an indicating scale 42 disposed around its outer periphery which is graduated so as to reflect torque exerted by the screwdriver 10 during a test. The smooth surface of the ring member 33 which abuts the ring member 34 allows the two or move easily with respect to each other, but the ribs 41 inhibit movement between the ring members 32 and 33.

As shown in FIG. 2, the ring member 32 includes balls 43 which are spaced around its periphery and which are held in place by springs 44. In addition, it includes a locking screw 45 to hold it on the shoulder 36. The balls 43 engage the groove 21 in the housing 20 and thereby help hold the blade 17 and the handle 15 rotatably together.

Figure 3:
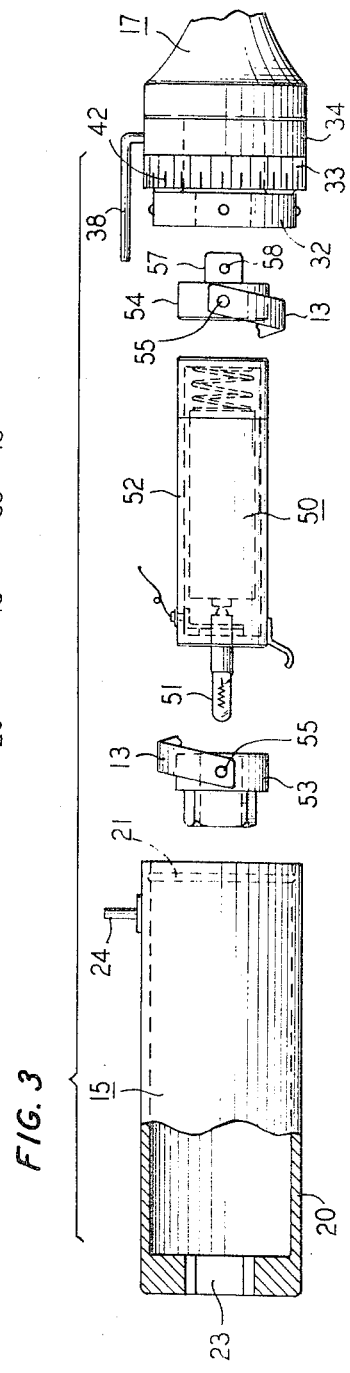
FIG. 3 is an elevation view of part of the torque-testing screwdriver shown in FIG. 1 with a portion in section and parts exploded to show internal details.

As shown in FIG. 3, the spring assembly 12 includes a signal device 50 which fits inside the spring 13. It comprises a signal 51, a battery unit 52 and two end lugs 53 and 54. In the arrangement disclosed, the signal 51 is a battery operated lamp. If desired, however, it could advantageously be a buzzer or other similar operator alerting device. The two lugs 53 and 54 each contain a pin 55 for engaging the ends of the spring 13.

As shown in FIG. 2, the lug 53 engages the handle 15, while the lug 54 engages the blade 17 when the screwdriver 10 is assembled so that neither handle nor blade can rotate independently of its respective lug. In the embodiment illustrated, the lug 53 is hexagonally shaped so as to fit the mounting hole 23 in the housing 20. Moreover, it has a central aperture to accommodate the signal 51. The lug 54 has a bladed end 57 which includes spring loaded balls 58 which engage the detents in the opening in the shoulder 36 when the handle 15 and the blade 17 are joined.

To begin a torque test, the ring member 34 is rotated until the indicator contact 38 engages the contact 24 thereby causing the signal 51 to be enabled. Next, the ring member 33 is rotated so that an appropriate index mark on the scale 42 is brought under the indicator contact 38. It should be noted that while the ring member 34 rotates in the disclosed embodiment, it may be fixedly attached to the boss 31 if desired.

Next, the screwdriver end 30 is inserted into a screw to be tested and the handle 15 turned so as to tighten the screw. Rotational movement of the screwdriver end 30 will not occur until the screw under test first begins to move. At that point, the torque value being sought has been reached and the slight rotational movement of the screw which occurs causes the contacts 24 and 38 to momentarily separate. As a result, the signal 51 is disabled and the operator is thereby advised that the sought-for torque level has been reached. The operator then discontinues further test and obtains the results by observing the graduation on the scale 42 which lies beneath the indicator contact 38.

In summary, a torque-testing screwdriver has been disclosed which measures torque by tightening a screw and which automatically signals the operator when the desired torque value is reached, thereby simplifying the test procedure and reducing the degree of attention the operator must devote to the testing apparatus. While only one embodiment of the invention has been disclosed, it is to be recognized that it is merely illustrative of the principles of the invention and that many other forms falling within the scope of the invention will readily occur to those skilled in the art.

What is claimed is:

1. In a torque-testing screwdriver having a blade for applying torque to a screw under test, a torque generating handle in rotatable contact with said blade and a spring for regulating the relative rotational movement between said blade and handle by transferring generated torque therebetween, the combination comprising:

a signal device for emitting an indicating signal when enabled;

a first ring member mounted on said blade and having graduations marked on its outer periphery;

a second ring member located adjacent to said first ring member and rotatably mounted on said blade;

an indicating contact for rotating said second ring member on said blade in response to rotation of said handle against said spring and for enabling said signal device when engaged by a fixed contact and when the magnitude of the torque exerted by said screwdriver has a magnitude less than the maximum resistive torque exerted by the screw under test, said indicating contact being fixedly attached to said second ring member; and a fixed contact for engaging said indicating contact in response to relative movement of said handle with respect to said blade, said fixed contact being fixedly attached to said handle.

2. The combination in accordance with claim 1 wherein said first ring member is rotatably mounted on said blade.

3. The combination in accordance with claim 1 wherein said signal device is located in said handle.

4. The combination in accordance with claim 3 wherein said signal device includes two lugs for holding both ends of said spring and for independently engaging said blade and said handle, respectively.

5. The combination in accordance with claim 4 wherein said handle includes a hexagonally-shaped opening, said blade includes a rectangular opening, one of said lugs is hexagonally shaped at its end to fit the hexagonal opening in said handle and the other of said lugs has a blade at one end to fit the rectangular opening in said blade.

6. The combination in accordance with claim 1 wherein said indicating contact is L-shaped.

7. The combination in accordance with claim 6 wherein said fixed contact projects upwardly from the surface of said handle and a portion of said indicating contact extends into the path said fixed contact will traverse when said handle and blade rotate with respect to each other.

8. The combination in accordance with claim 7 wherein said first ring member is located between said fixed contact and said second ring member, whereby a portion of said indicating contact extends across its scale.

9. The combination in accordance with claim 7 wherein said first ring member is held on said blade by a third ring member and said third ring member includes means for joining said handle to said blade.

10. The combination in accordance with claim 9 wherein said first ring member includes motion inhibiting friction ribs on one face in frictional contact with said third ring member.

* * * * *